United States Patent
Yang et al.

(10) Patent No.: US 8,802,967 B2
(45) Date of Patent: Aug. 12, 2014

(54) PHOTOELECTRIC CONVERSION MODULE

(75) Inventors: Nam-Choul Yang, Suwon-si (KR);
Ji-Won Lee, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 352 days.

(21) Appl. No.: 12/662,337

(22) Filed: Apr. 12, 2010

(65) Prior Publication Data

US 2011/0168225 A1    Jul. 14, 2011

(30) Foreign Application Priority Data

Jan. 8, 2010    (KR) .................... 10-2010-0001879

(51) Int. Cl.
*H02N 6/00* (2006.01)
*H01L 31/042* (2014.01)
*H01G 9/20* (2006.01)

(52) U.S. Cl.
CPC ............. *H01G 9/2068* (2013.01); *Y02E 10/542* (2013.01)
USPC ........................................................ 136/251

(58) Field of Classification Search
CPC ........................... H01G 9/2068; H01G 9/2077
USPC ................................................. 136/244, 252
See application file for complete search history.

(56) References Cited

U.S. PATENT DOCUMENTS

| | | | |
|---|---|---|---|
| 5,582,653 A | 12/1996 | Kataoka et al. | |
| 2003/0127130 A1* | 7/2003 | Murai et al. | 136/263 |
| 2004/0074531 A1* | 4/2004 | Matsui et al. | 136/244 |
| 2004/0238026 A1* | 12/2004 | Miyoshi | 136/263 |
| 2004/0258980 A1* | 12/2004 | Ogura | 429/52 |
| 2008/0041438 A1* | 2/2008 | Saito et al. | 136/244 |
| 2011/0174352 A1 | 7/2011 | Yang et al. | |

FOREIGN PATENT DOCUMENTS

| | | |
|---|---|---|
| JP | 2003-100362 A | 4/2003 |
| JP | 2004327167 | 11/2004 |
| JP | 2006-004827 | 1/2006 |
| JP | 2007-220606 | 8/2007 |
| JP | 2007220606 A * | 8/2007 |
| JP | 2007-280906 | 10/2007 |
| KR | 10-0928009 B1 | 11/2009 |
| WO | 2010137781 A1 | 12/2010 |

OTHER PUBLICATIONS

The Korean Office Action issued by KIPO, dated May 4, 2011, corresponding to Korean Patent Application No. 10-2010-0001879, together with Request for Entry.
Korean Registration Determination Certificate issued by KIPO on Dec. 15, 2011, corresponding to KR 10-2010-0001879 and Request for Entry attached herewith.

* cited by examiner

*Primary Examiner* — Eli Mekhlin
(74) *Attorney, Agent, or Firm* — Robert E. Bushnell, Esq.

(57) ABSTRACT

A photoelectric conversion module including a pair of substrates facing each other and forming a space for containing an electrolyte therein, a sealing member placed along the edges of the pair of substrates to seal the electrolyte, defining a plurality of photoelectric cells between the pair of substrates, and having an open portion to form an electrolyte inlet, and an inlet sealer formed along the electrolyte inlet. The photoelectric conversion module has improved durability, reliability, and mass-productivity.

15 Claims, 8 Drawing Sheets

PHOTOELECTRIC CONVERSION MODULE

CLAIM OF PRIORITY

This application makes reference to, incorporates into this specification the entire contents of, and claims all benefits accruing under 35 U.S.C. §119 from an application earlier filed in the Korean Intellectual Property Office on Jan. 8, 2010, and there duly assigned Serial No. 10-2010-0001879.

BACKGROUND OF THE INVENTION

1. Field of the Invention

One or more embodiments of the present invention relate to a photoelectric conversion module, and more particularly, to a photoelectric conversion module having an improved structure for sealing an electrolyte.

2. Description of the Related Art

Photoelectric conversion devices convert light energy into electric energy and have been studied as an energy source for replacing fossil fuels. Thus, solar cells have come into the spotlight.

SUMMARY OF THE INVENTION

One or more embodiments of the present invention include an improved photoelectric conversion module.

One or more embodiments of the present invention include a photoelectric conversion module having improved durability, reliability, and mass-productivity.

Additional aspects will be set forth in part in the description which follows and, in part, will be apparent from the description, or may be learned by practice of the presented embodiments.

According to one or more embodiments of the present invention, a photoelectric conversion module is constructed with a pair of substrates facing each other and forming a space for containing an electrolyte therein, a sealing member placed along edges of the pair of substrates to seal the electrolyte, defining a plurality of photoelectric cells between the pair of substrates, and having an open portion to form an electrolyte inlet, and an inlet sealer formed along the electrolyte inlet.

Each of the pair of substrates may have a rectangular plate shape, and the sealing member may have the open portion along a side of the pair of substrates to form the electrolyte inlet. The inlet sealer may be formed along the side of the pair of substrates.

Each of the pair of substrates may have a rectangular shape including first and second long sides parallel to each other, and first and second short sides parallel to each other between the first and second long sides.

The sealing member may have the open portion along one of the first long side, the second long side, the first short side, and the second short side of the pair of substrates.

Alternatively, the sealing member may be formed along the first and second long sides and the first short side of the pair of substrates. The sealing member may have the open portion along the second short side of the pair of substrates.

The sealing member may include a first portion extending along the first and second long sides and the first short side of the pair of substrates, and second portions extending from the first portion corresponding to the first short side along the direction of the first and second long sides, and defining neighboring photoelectric cells.

The inlet sealer may be formed along the second short side of the pair of substrates, may have a wide width along the direction of the first and second long sides, and may contact at least the second portions to define the neighboring photoelectric cells with the second portions.

Each of the second portions may include a space for accommodating a connection member for connecting the neighboring photoelectric cells.

Each of the plurality of photoelectric cells may include first and second electrodes respectively formed on the pair of substrates, a semiconductor layer formed on the first electrode, and the electrolyte disposed between the semiconductor layer and the second electrode.

The inlet sealer may be formed of a resin or a glass frit.

The photoelectric conversion module may further include a cap member disposed on an outer side of the inlet sealer.

According to one or more embodiments of the present invention, a photoelectric conversion module is constructed with a pair of substrates facing each other and forming a space for containing an electrolyte therein, a sealing member placed along the edges of the pair of substrates to seal the electrolyte, defining a plurality of photoelectric cells between the pair of substrates, and having an open portion along a side of the pair of substrates to form an electrolyte inlet, and an inlet sealer formed along the electrolyte inlet to seal the electrolyte.

Each of the pair of substrates may have a rectangular shape including first and second long sides parallel to each other, and first and second short sides parallel to each other between the first and second long sides.

The sealing member may be formed along the first and second long sides and the first short side of the pair of substrates. The sealing member may have the open portion along the second short side of the pair of substrates.

The sealing member may include a first portion extending along the first and second long sides and the first short side of the pair of substrates, and second portions extending from the first portion corresponding to the first short side along the direction of the first and second long sides, and defining neighboring photoelectric cells.

The inlet sealer may be formed along the second short side of the pair of substrates, may have a wide width along the direction of the first and second long sides, and may contact at least the second portions to define the neighboring photoelectric cells with the second portions.

Each of the second portions may include a space for accommodating a connection member for connecting neighboring photoelectric cells.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Different types of solar cells having various driving principles have been investigated. Silicon or crystalline solar cells have a wafer shape and include a p-n semiconductor junction, but the manufacturing costs thereof are high due to the characteristics of processes for forming and handling semiconductor materials having a high degree of purity.

Unlike silicon solar cells, dye-sensitized solar cells mainly include a photosensitive dye for generating excited electrons in response to visible light, a semiconductor material for receiving the excited electrons, and an electrolyte for reacting with the excited electrons in an external circuit. Dye-sensitized solar cells have high photoelectric conversion efficiency compared to the silicon solar cells, and thus are expected to be the next generation of solar cells.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

Figure 1:
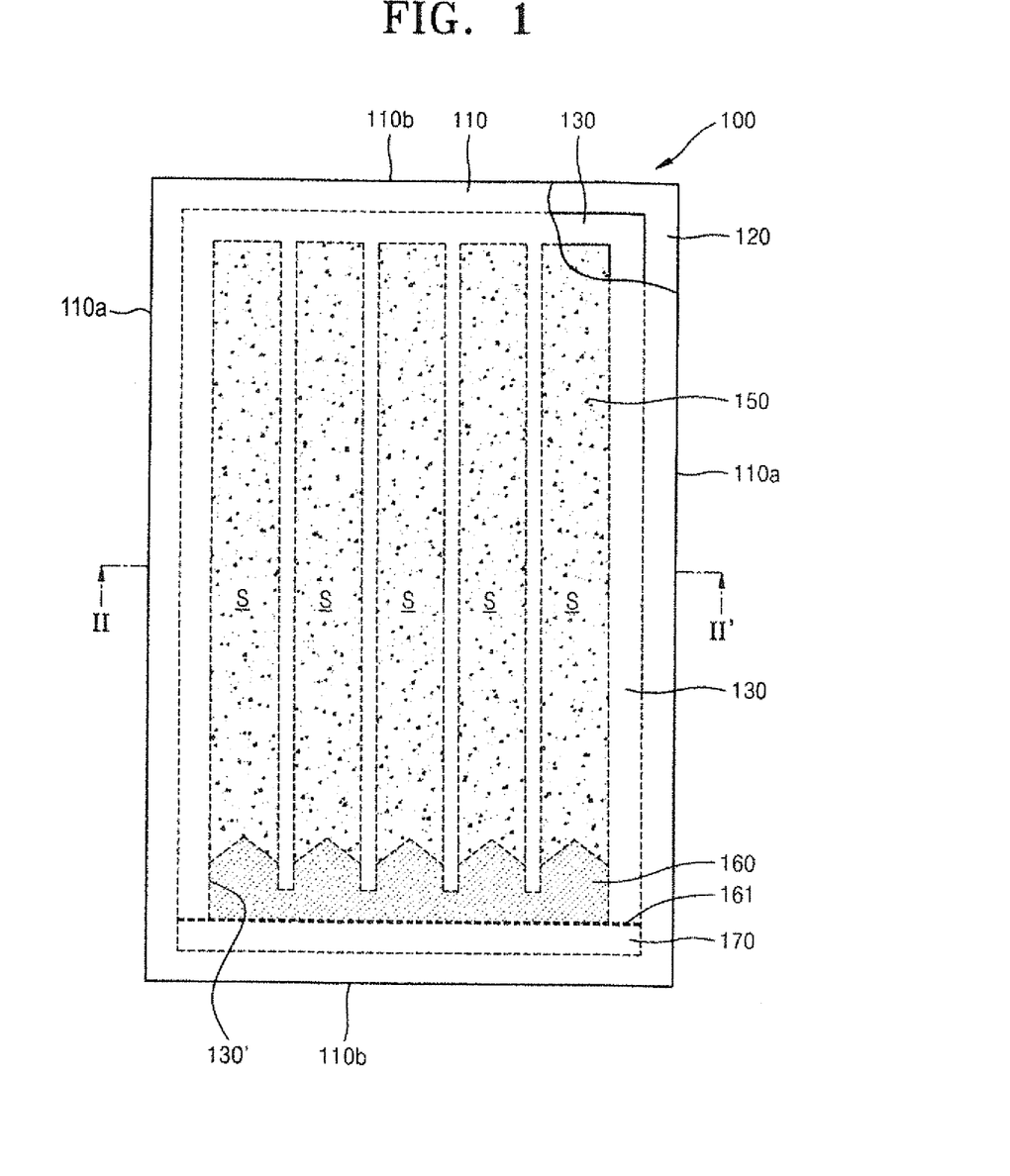
FIG. 1 is a plan view illustrating a photoelectric conversion module constructed as an embodiment according to the principles of the present invention.

FIG. 1 is a plan view illustrating a photoelectric conversion module 100 constructed as an embodiment according to the principles of the present invention. Referring to FIG. 1, photoelectric conversion module 100 includes a plurality of photoelectric cells S. Photoelectric cells S are separated from each other by a sealing member 130 disposed therebetween. For example, photoelectric cells S may be modularized as each photoelectric cell S is connected to neighboring photoelectric cells S in series or in parallel through a connection member (not shown), and photoelectric cells S are physically supported between a light receiving substrate 110 and a counter substrate 120.

Photoelectric cells S are filled with an electrolyte 150 which is sealed therein by using sealing member 130 disposed along edges of photoelectric conversion module 100 and between neighboring photoelectric cells S. Sealing member 130 is formed around electrolyte 150 to surround electrolyte 150, and seals electrolyte 150 so that electrolyte 150 does not leak from photoelectric cells S.

Light receiving substrate 110 may have a rectangular shape including long sides 110a that are parallel to each other, and short sides 110b that are parallel to each other and respectively perpendicular to long sides 110a. Sealing member 130 has an open portion along any one of long sides 110a and short sides 110b of light receiving substrate 110, for example, short side 110b, for forming of an electrolyte inlet 130'. After electrolyte 150 is injected into photoelectric conversion module 100 through electrolyte inlet 130', an inlet sealer 160 may be formed by sealing electrolyte inlet 130' with a sealing paste.

In other words, by injecting electrolyte 150 through electrolyte inlet 130' and sealing electrolyte inlet 130' with inlet sealer 160 after electrolyte 150 is injected, electrolyte 150 may be easily injected into photoelectric conversion module 100 without using a special pressurizing device, such as a syringe, that is generally used to inject an electrolyte.

Inlet sealer 160 may be formed by pasting a sealing paste along the open portion of sealing member 130, and then hardening the sealing paste if required. As such, electrolyte inlet 130' may be easily sealed by coating the sealing paste. The sealing paste may be a sealing resin solution.

A material for forming inlet sealer 160 is not limited as long as it seals electrolyte 150, and may be a resin or a glass frit. In detail, inlet sealer 160 may be formed of a material having a selective fluidity according to a temperature. That is, the material of inlet sealer 160 may have a fluidity which may be varied according to a temperature. For example, inlet sealer 160 may be formed of a material that has a fluidity sufficient to be coated along short side 110b at a high temperature, and is hardened at a general operating temperature to seal electrolyte 150. In more detail, inlet sealer 160 may be formed of a resin, such as an acryl-based resin, an epoxy-based resin, a silicon-based resin, an olefin-based resin, an olefin-acrylic acid-based resin, an acrylic acid-based resin including an olefin-metal ion, or an olefin-acrylate-based resin, or a glass frit. Inlet sealer 160 may be formed not only of a temperature-sensitive material having different fluidity according to a temperature, but also a light sensitive material having different fluidity according to light irradiation.

A cap member 170 may be further disposed on an outer side of inlet sealer 160 so as to seal electrolyte inlet 130'. Cap member 170 may be formed of a material that blocks harmful substances, such as oxygen or moisture, and for example, may be formed of a glass plate or a metal thin plate. Cap member 170 may be adhered to the outer side of inlet sealer 160 via a sealant 161.

Figure 2:
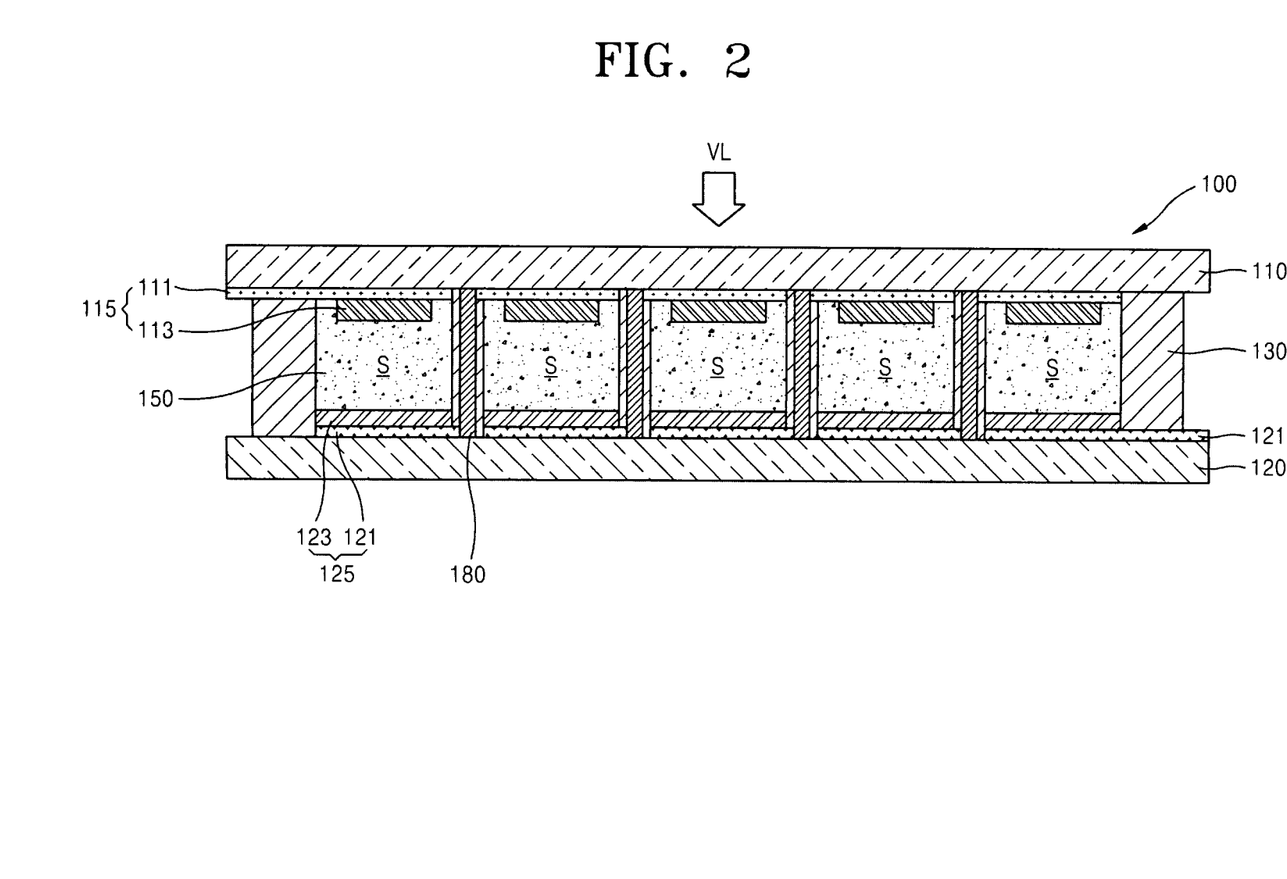
FIG. 2 is a cross-sectional view of the photoelectric conversion module constructed as the embodiment according to the principles of the present invention taken along line II-II' of FIG. 1.

FIG. 2 is a cross-sectional view of photoelectric conversion module 100 taken along line II-II' of FIG. 1. Referring to FIG. 2, photoelectric conversion module 100 includes light receiving substrate 110 and counter substrate 120 facing each other, and the plurality of photoelectric cells S disposed between light receiving substrate 110 and counter substrate 120 and separated by sealing member 130. A connection member 180 is disposed between the neighboring photoelectric cells S so as to connect the neighboring photoelectric cells S in series, for example.

An optical electrode 111 and a counter electrode 121 are respectively formed on light receiving substrate 110 and counter substrate 120, and light receiving substrate 110 and counter substrate 120 are adhered to each other by using sealing member 130. A predetermined gap is formed between light receiving substrate 110 and counter substrate 120. A semiconductor layer 113 is formed on optical electrode 111. Semiconductor layer 113 includes a photosensitive dye that is excited by a light VL. Electrolyte 150 is disposed between semiconductor layer 113 and counter electrode 121.

Light receiving substrate 110 may be transparent, and may be formed of a material having a high light transmittance. For example, light receiving substrate 110 may be formed of glass or a resin film. Since the resin film is generally flexible, the resin film may be used for light receiving substrate 110 that requires flexibility.

Optical electrode 111 may operate as a negative electrode of photoelectric conversion module 100, and may provide a current path by collecting electrons generated according to photoelectric conversion. Light VL incident on semiconductor layer 113 through optical electrode 111 may operate as an excitation source of the photosensitive dye adhered to semiconductor layer 113. Optical electrode 111 may be formed of a transparent conducting oxide (TCO), such an indium tin oxide (ITO), a fluorine-doped tin oxide (FTO), or an antimony tin oxide (ATO), which has both a relatively higher electric conductivity and a relatively higher light transmittance. Optical electrode 111 may further include a metal electrode formed of gold (Ag), silver (Au), or aluminum (Al) having excellent electric conductivity. The metal electrode may be used to reduce an electric resistance of optical electrode 111, and may have a stripe pattern or a mesh pattern.

Semiconductor layer 113 may be formed of a semiconductor material generally used for a photoelectric conversion device, and may be formed of an oxide of a metal, such as cadmium (Cd), zinc (Zn), indium (In), plumbum (Pb), molybdenum (Mo), tungsten (W), stibium (Sb), titanium (Ti), gold (Ag), manganese (Mn), tin (Sn), zirconium (Zr), strontium (Sr), gallium (Ga), silicon (Si), or a chromium (Cr). A photoelectric conversion efficiency of semiconductor layer 113 may be increased by including the photosensitive dye in semiconductor layer 113. For example, semiconductor layer 113 may be formed by coating a paste in which semiconductor particles having a particle diameter in the range of about 5 nm to about 1000 nm are distributed on light receiving substrate 110, and then performing a heating process or pressurizing process on light receiving substrate 110.

Photosensitive dyes adhered to semiconductor layer 113 absorb light VL incident through light receiving substrate 110, and electrons of the photosensitive dyes are excited from a ground state. The excited electrons are transferred to a conduction band of semiconductor layer 113 by an electric bond between the photosensitive dyes and semiconductor layer 113, reach optical electrode 111 through semiconductor layer 113, and then form a driving current that drives an external circuit (not shown) by being extracted outside photoelectric conversion module 100 through optical electrode 111.

For example, the photosensitive dyes adhered to semiconductor layer 113 are formed of molecules that absorb light VL in a visible light band, and quickly induce the excited electrons to move to semiconductor layer 113. The photosensitive dyes may be in a liquefied state, a gel state (half solid state), or a solid state. For example, the photosensitive dyes adhered to semiconductor layer 113 may be ruthenium-based photosensitive dyes. Semiconductor layer 113 to which the photosensitive dyes are adhered may be obtained by impregnating light receiving substrate 110 on which semiconductor layer 113 is formed in a solution including the photosensitive dyes.

Electrolyte 150 may be a Redox electrolyte including a pair of an oxidized material and a reduced material, and may be in a solid state, a gel state, or a liquid state.

Meanwhile, counter substrate 120 facing light receiving substrate 110 may not be transparent, but may be formed of a transparent material so that photoelectric conversion module 100 receives light VL from both sides so as to increase the photoelectric conversion efficiency, and may be formed of the same material as light receiving substrate 110. In particular, when photoelectric conversion module 100 is used as a building integrated photovoltaic (BIPV) device installed in a structure such as a window frame, both sides of photoelectric conversion module 100 may be transparent so as not to block light VL transmitted into the room.

Counter electrode 121 may operate as a positive electrode of photoelectric conversion module 100. The photosensitive dye adhered to semiconductor layer 113 may be excited by absorbing light VL, and the excited electrons of the photosensitive dye may be extracted outside photoelectric conversion module 100 through optical electrode 111. Meanwhile, the photosensitive dyes that lost electrons are reduced by collecting electrons generated by oxidizing electrolyte 150, and the oxidized electrolyte 150 is reduced by the electrons that reached counter electrode 121 through the external circuit. Thus, the operation of the photoelectric conversion device is completed.

Counter electrode 121 may be formed of TCO, such as ITO, FTO, or ATO, which have both electric conductivity and light transmittance. Counter electrode 121 may further include a metal electrode formed of Ag, Au, or Al having excellent electric conductivity. The metal electrode may be used to reduce the electric resistance of counter electrode 121, and may have a stripe pattern or a mesh pattern.

A catalyst layer 123 may be formed on counter electrode 121. Catalyst layer 123 is formed of a material having a reduction catalyst function for providing electrons, for example, a metal, such as platinum (Pt), Ag, Au, copper (Cu), or Al, a metal oxide, such as a tin oxide, or a carbon-based material, such as graphite.

Sealing member 130 disposed between light receiving substrate 110 and counter substrate 120 maintains a uniform distance between light receiving substrate 110 and counter substrate 120, and simultaneously defines the plurality of photoelectric cells S flatly arranged between light receiving substrate 110 and counter substrate 120. Also, sealing member 130 surrounds electrolyte 150 injected into photoelectric conversion module 100 to seal electrolyte 150. Sealing member 130 may be formed of a thermalsetting resin, such as epoxy, a thermoplastic resin, such as ionomer, or a photocurable resin, such as ultraviolet (UV) curable epoxy.

Connection member 180 for electrically connecting photoelectric cells S is disposed near sealing member 130. For example, connection member 180 may be disposed in a space defined by sealing member 130, or through sealing member 130. Connection member 180 may extend vertically to contact optical electrode 111 and counter electrode 121 respectively disposed at the top and bottom of connection member 180, and may connect the neighboring photoelectric cells S between optical electrode 111 and counter electrode 121 in series. Connection member 180 may be formed of a metal having excellent conductivity, and for example, may be formed by filling a conductive paste in the space defined by sealing member 130.

Figure 3:
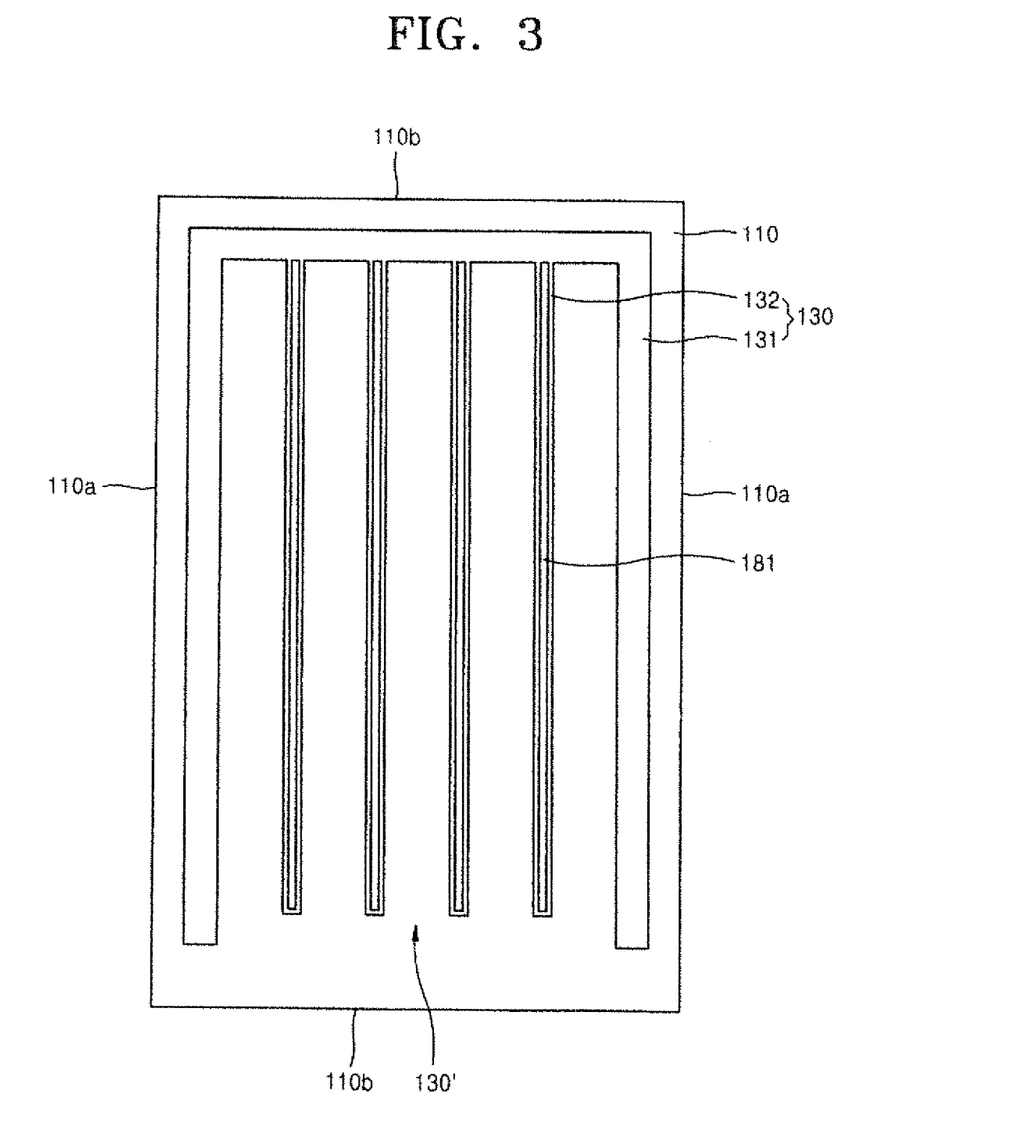
FIG. 3 is a plan view of a sealing member illustrated in FIG. 1 constructed as the embodiment according to the principles of the present invention.

FIG. 3 is a plan view of sealing member 130 illustrated in FIG. 1. Referring to FIG. 3, sealing member 130 extends along long sides 110*a* and short sides 110*b* of light receiving substrate 110 so as to form a space for containing electrolyte 150, and extends to an internal area of light receiving substrate 110 so as to define the plurality of photoelectric cells S flatly arranged between light receiving substrate 110 and counter substrate 120. In detail, sealing member 130 includes a first portion 131 extending along long sides 110*a* and short sides 110*b*, and second portions 132 extending to the internal area of light receiving substrate 110 and defining and separating the neighboring photoelectric cells S. Second portion 132 may include an accommodating space 181 for accommodating connection member 180 for electrically connecting the neighboring photoelectric cells S.

In detail, first portion 131 extends along the pair of long sides 110*a* parallel to each other, and one short side 110*b*. Sealing member 130 has an open portion along the other short side 110*b* so as to form electrolyte inlet 130'. Electrolyte 150 of FIG. 2 is injected through electrolyte inlet 130' of FIG. 3.

Figure 4:
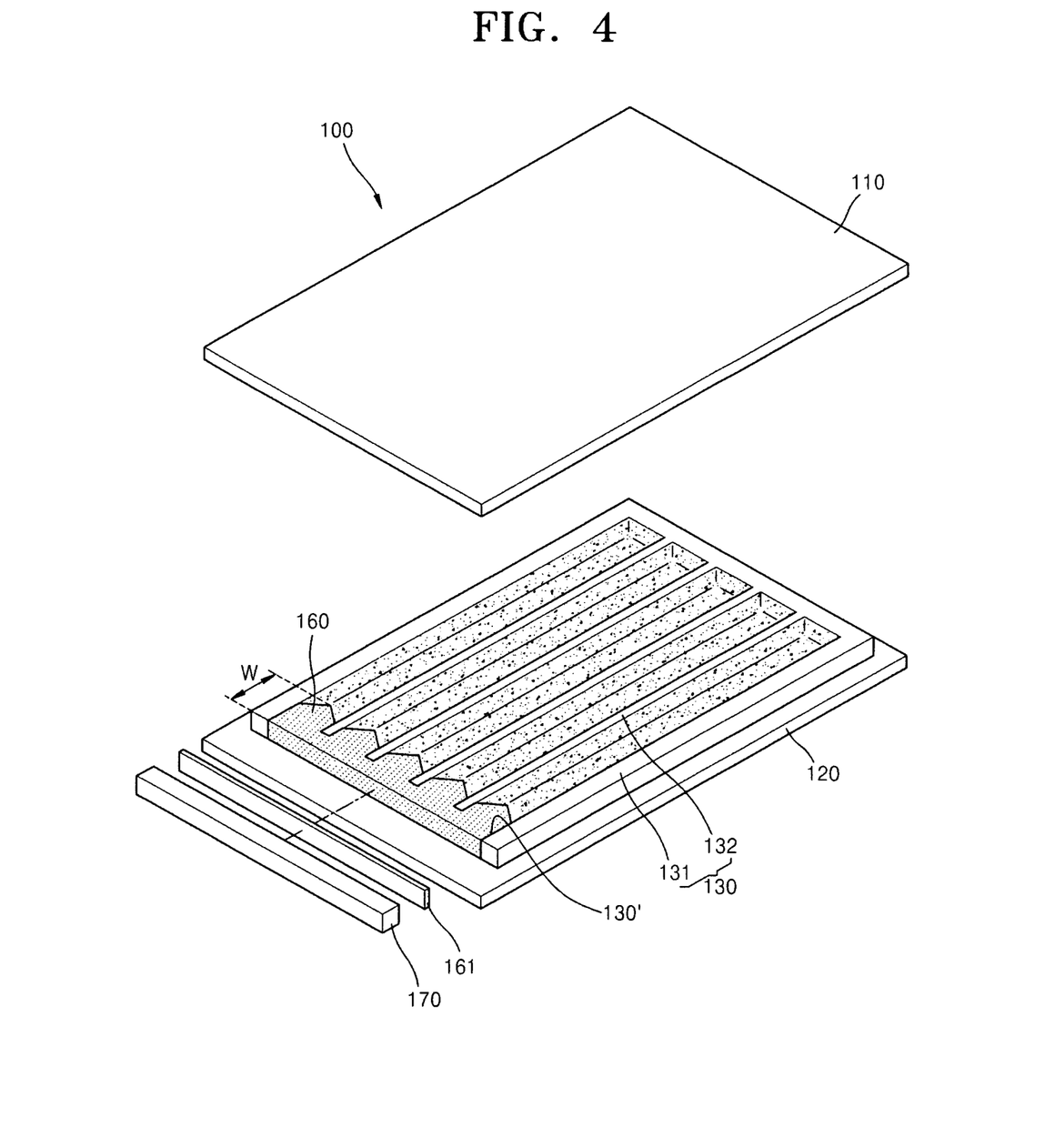
FIG. 4 is a diagram illustrating an arrangement of an inlet sealer and a cap member as an embodiment according to the principles of the present invention.

FIG. 4 is a diagram illustrating an arrangement of inlet sealer 160 and cap member 170. As shown in FIG. 4, inlet sealer 160 is formed after electrolyte 150 is injected. Inlet sealer 160 has a wide width W to close photoelectric cells S. In other words, inlet sealer 160 has wide width W to contact at least second portions 132, thereby defining photoelectric cells S together with second portions 132.

Photoelectric conversion module 100 may be a double sealing structure by including cap member 170 on an outer side of inlet sealer 160. Cap member 170 may be attached to an outer side of inlet sealer 160 by disposing sealant 161 therebetween.

Figure 5A:
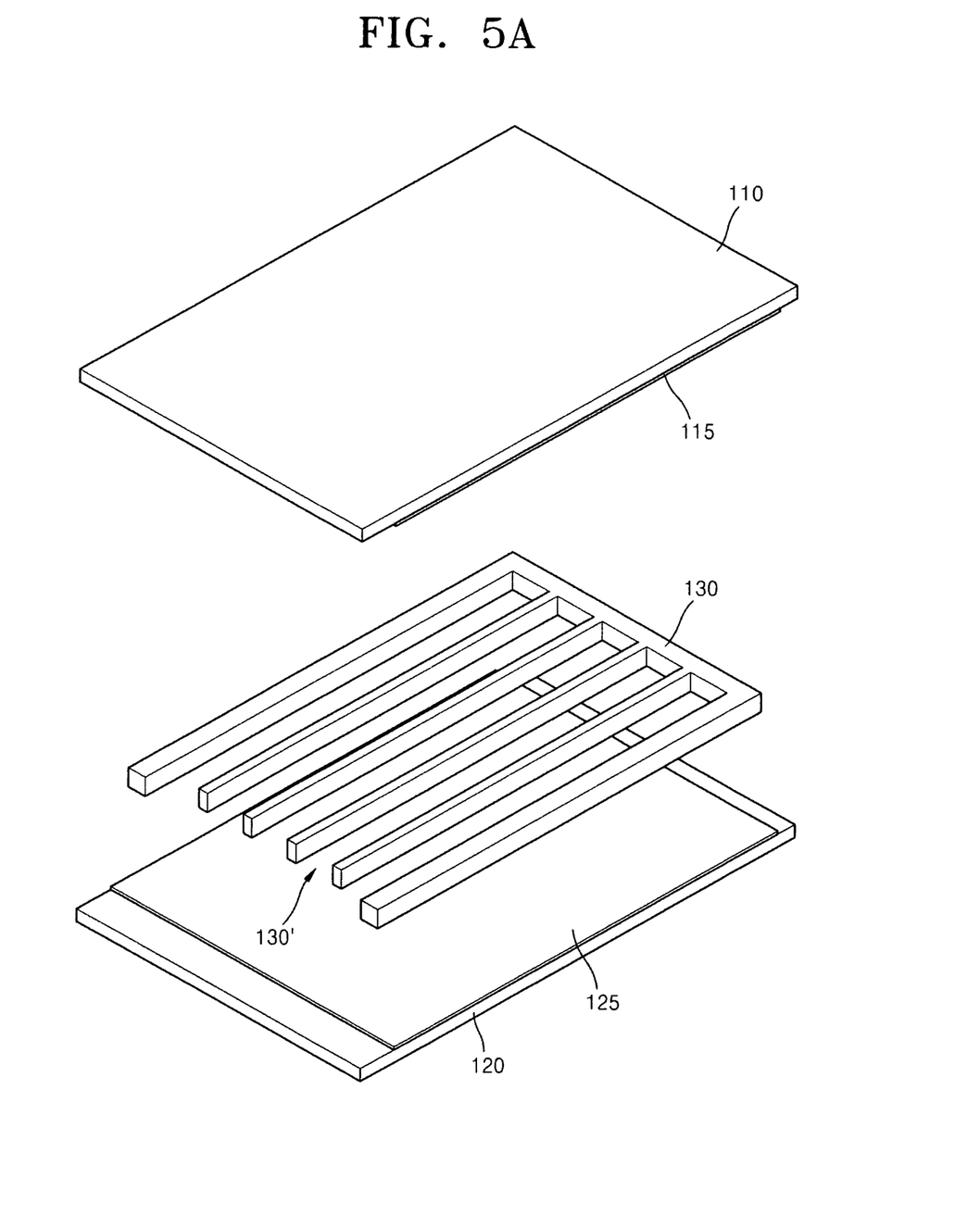
FIGS. 5A through 5C are diagrams for describing a method of manufacturing the photoelectric conversion module of FIG. 1 as an embodiment according to the principles of the present invention.
Figure 5B:
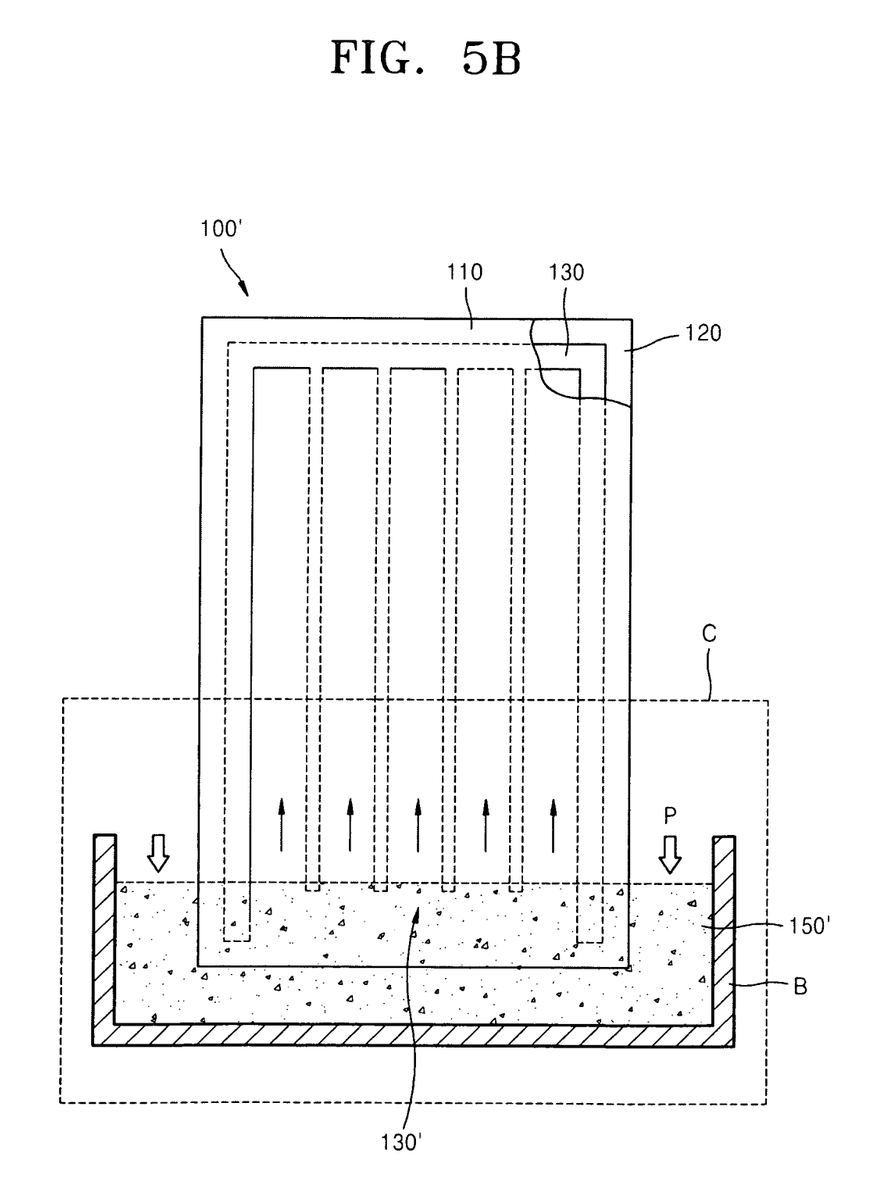
Figure 5C:
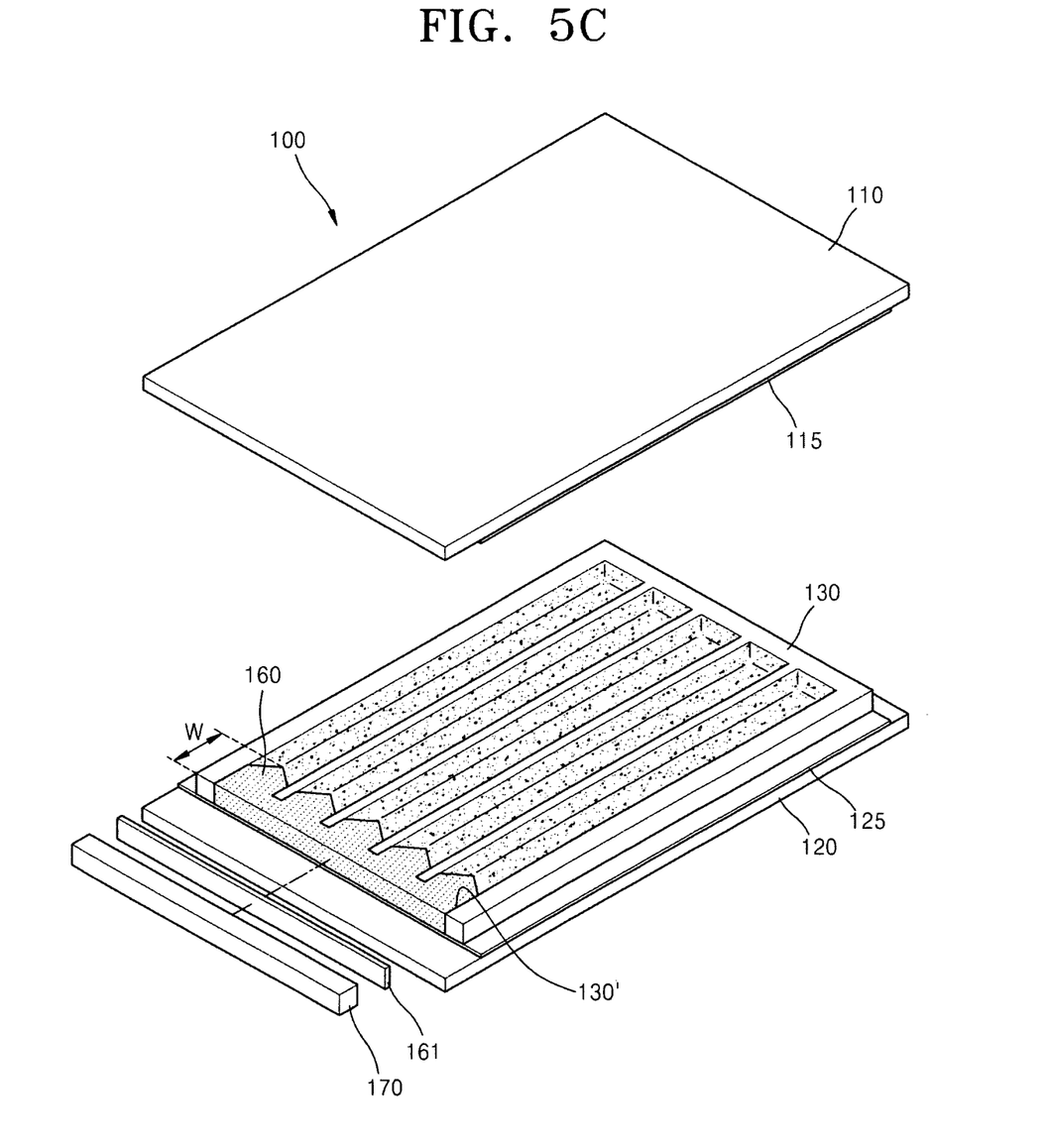

FIGS. 5A through 5C are diagrams for describing a method of manufacturing photoelectric conversion module 100 of FIG. 1 as an embodiment according to the principles of the present invention. First, as shown in FIG. 5A, light receiving substrate 110 on which a functional layer 115 is formed and counter substrate 120 on which a functional layer 125 is formed are prepared. Functional layers 115 and 125 perform photoelectric conversion. For example, functional layer 115 includes semiconductor layer 113 of FIG. 2 for generating excited electrons by receiving light, and optical electrode 111 of FIG. 2 for generating a current path for the excited electrons, and functional layer 125 includes the counter electrode 121 of FIG. 2 for generating the current path, and catalyst layer 123 of FIG. 2 for catalyzing electrolyte 150 of FIG. 2.

Then, light receiving substrate 110 and counter substrate 120 are disposed to face each other, and are attached to each other by disposing sealing member 130 therebetween and then heating and pressurizing light receiving substrate 110 and counter substrate 120. Sealing member 130 has the open portion to form electrolyte inlet 130'.

Then, electrolyte 150 is injected through electrolyte inlet 130'. For example, as shown in FIG. 5B, a substrate assembly 100' including the attached light receiving substrate 110 and counter substrate 120 is disposed in an upright position, and substrate assembly 100' is dipped into a container B filled with an electrolyte solution 150' in such a way that electrolyte inlet 130' faces downward. The injecting of electrolyte solution 150' may be performed in a sealed chamber C, for example, under an atmosphere of insert gas having a certain pressure P. Electrolyte solution 150' in container B may be injected into substrate assembly 100' by certain pressure P, and electrolyte solution 150' may be easily injected by using electrolyte inlet 130' that is widely opened at one side.

Next, after injecting electrolyte solution 150', electrolyte inlet 130' is sealed. For example, as shown in FIG. 5C, inlet sealer 160 is formed by pasting a sealing paste along electrolyte inlet 130', and by hardening the sealing paste if required. Inlet sealer 160 may be formed of a resin or a glass frit. Then, electrolyte inlet 130' may be further sealed by using cap member 170. For example, cap member 170 may be attached to inlet sealer 160 by disposing sealant 161 therebetween.

Figure 6:
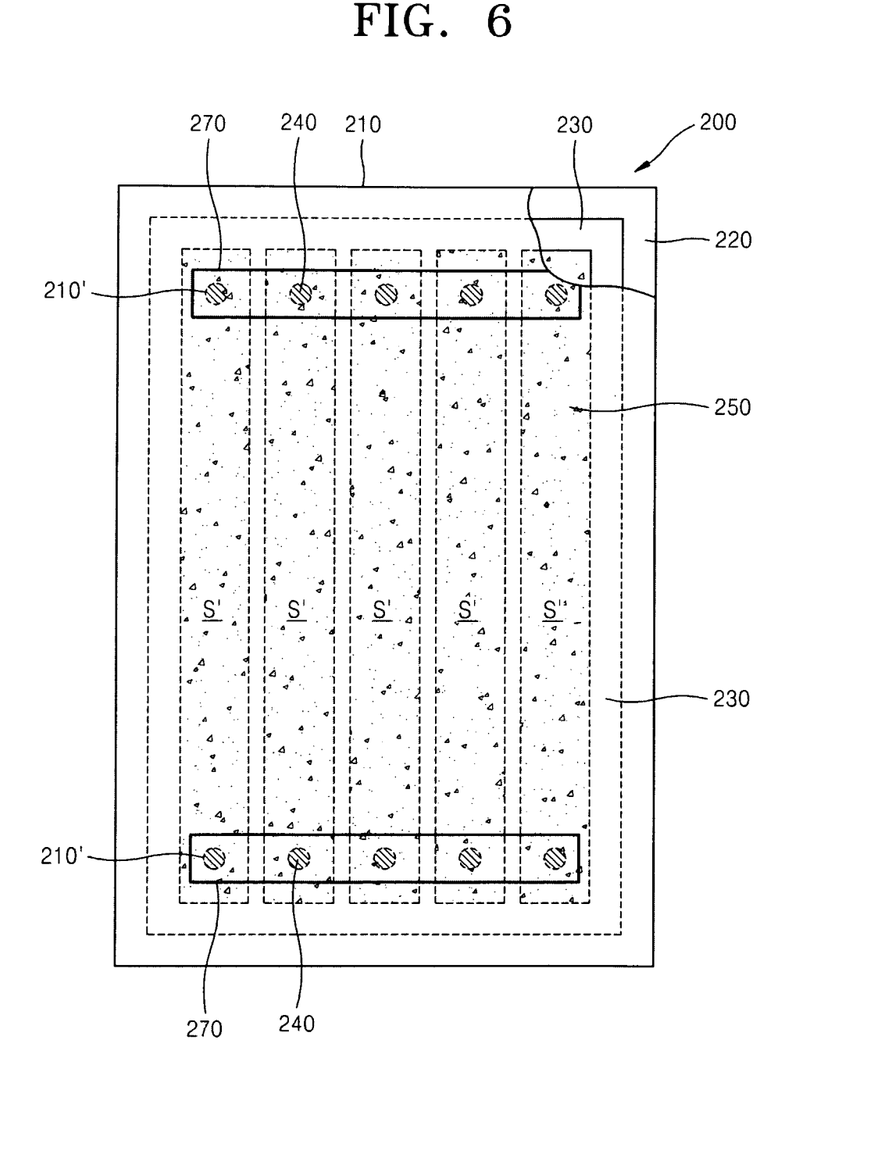
FIG. 6 is a plan view of a photoelectric conversion module according to a comparative example to be compared with the photoelectric conversion module of FIG. 1.

FIG. 6 is a plan view of a photoelectric conversion module 200 constructed as a comparative example to be compared with photoelectric conversion module 100 of FIG. 1. Referring to FIG. 6, photoelectric conversion module 200 includes first and second substrates 210 and 220 that face each other and are attached to each other, and a plurality of photoelectric cells S disposed between first and second substrates 210 and 220, respectively. A sealing member 230 is disposed between first and second substrate 210 and 220, respectively, extends along the edges of first and second substrates 210 and 220, respectively, to form a space for containing an electrolyte 250, and extends inside a space formed between first and second substrates 210 and 220, respectively, to define and separate photoelectric cells S'.

First substrate 210 includes a plurality of electrolyte inlet holes 210' for injecting electrolyte 250. Electrolyte inlet holes 210' are formed at each location corresponding to photoelectric cells S'. For example, a pair of electrolyte inlet holes 210' may be formed at each photoelectric cell S'. After electrolyte 250 is injected, a sealing plug 240 is inserted into electrolyte inlet hole 210', and electrolyte inlet hole 210' may be further sealed by a sealing cap 270 extending over electrolyte inlet hole 210' in one line.

In photoelectric conversion module 200, electrolyte 250 is injected through electrolyte inlet hole 210' that is smaller than electrolyte inlet 130' of FIG. 1, and thus a separate pressurizing unit, such as a syringe, is used to inject electrolyte 250. Also, since the plurality of electrolyte inlet holes 210' are formed on first substrate 210, manufacturing costs of first substrate 210 may be increased, the production yield of first substrate 210 may be decreased, and the strength of first substrate 210 may be decreased. In addition, since electrolyte inlet holes 210' are individually sealed, the number of operations for forming first substrate 210 may be increased.

Meanwhile, photoelectric conversion module 100 of FIG. 1 includes electrolyte inlet 130' on one side for injecting electrolyte 150. Accordingly, a separate pressurizing unit is not required, and electrolyte 150 may be easily injected. Also, since electrolyte inlet 130' is sealed at once by pasting the sealing paste, a sealing process may also be easily performed.

As described above, according to the one or more of the above embodiments of the present invention, a photoelectric conversion module includes an electrolyte inlet that is opened on one side of the photoelectric conversion module, and thus a hole may not be formed on a substrate to inject an electrolyte. Accordingly, manufacturing costs for forming the hole are reduced, and a production yield of the photoelectric conversion module is increased because manufacturing processes are simplified. Also, since the deterioration of the substrate caused by forming the hole is fundamentally prevented, durability of the photoelectric conversion module is increased.

In addition, the electrolyte may be sealed by pasting an inlet sealer at once along the electrolyte inlet, and thus a sealing process may be simplified, and the production yield of the photoelectric conversion module may be increased.

Moreover, by forming the inlet sealer and a cap member along the electrolyte inlet, the photoelectric conversion module has a double sealing structure. Accordingly, external harmful substances are blocked from entering the photoelectric conversion module, and contamination or leakage of the electrolyte may be effectively prevented.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A photoelectric conversion module, comprising:
a pair of substrates facing each other and forming a space bounded by a continuum of sides forming a volume containing a plurality of photoelectric cells located between the substrates and confining an electrolyte within the plurality of photoelectric cells, each of the substrates comprising first and second spaced-apart sides separated by first and second intermediate sides;
a seal placed along those sides, the seal confining the electrolyte within the plurality of photoelectric cells, said seal comprising a continuous first portion extending along one of the sides, and second portions extending from the first portion and into corresponding ones of the plurality of photoelectric cells along a direction traversing the one of the sides to end points, each respective second portion and an adjacent second portion defining neighboring ones of the photoelectric cells, and the end points of neighboring second portions being separated from each other to form open portions comprising electrolyte inlets accessing corresponding ones of the photoelectric cells, each of the plurality of photoelectric cells comprising:
  first and second electrodes respectively formed on the pair of substrates;
  a semiconductor layer formed on the first electrode;
  a catalyst layer formed on the second electrode; and
  the electrolyte being disposed between the semiconductor layer and the second electrode, and between the catalyst layer and the first electrode; and
an inlet sealer formed along the electrolyte inlet of each one of the photoelectric cells sealing the electrolyte inlet of each one of the photoelectric cells.

2. The photoelectric conversion module of claim 1, further comprising a cap member disposed on said inlet sealer for further sealing the electrolyte inlet.

3. A photoelectric conversion module, comprising:
  a pair of substrates facing each other, forming a space containing an electrolyte therein, and defining a plurality of photoelectric cells therebetween, each substrate comprising first and second long sides parallel to each other, and first and second short sides parallel to each other and disposed between the first and second long sides;
  a seal placed along edges of the pair of substrates for sealing the electrolyte, the sealing member comprising a continuous first portion extending along the first short side of the substrates, and second portions extending from the first portion corresponding to the first short side along a direction of first and second long sides to end points, each respective second portion and an adjacent second portion defining a respective one of the photoelectric cells disposed therebetween, and end points of adjacent second portions being separated from each other to form open portions comprising electrolyte inlets of each said respective one of the photoelectric cells;
  an inlet sealer formed along the electrolyte inlet of each one of the photoelectric cells sealing the electrolyte inlet of said each one of the photoelectric cells; and
  a cap member disposed on an outer side of said inlet sealer further sealing the electrolyte inlet of said each one of the photoelectric cells;
  each of the plurality of photoelectric cells comprising:
    first and second electrodes respectively formed on the pair of substrates;
    a semiconductor layer formed on the first electrode;
    a catalyst layer formed on the second electrode; and
    the electrolyte being disposed between the semiconductor layer and the second electrode, and between the catalyst layer and the first electrode.

4. The photoelectric conversion module, of claim 3, wherein each of the pair of substrates has a rectangular shape.

5. The photoelectric conversion module of claim 3, wherein the sealing member has the open portion along the second short side of the pair of substrates.

6. The photoelectric conversion module of claim 3, wherein the second portions separate adjacent photoelectric cells from each other.

7. The photoelectric conversion module of claim 3, wherein the inlet sealer is formed along the second short side of the pair of substrates, has a wide width along the direction of the first and second long sides, and contacts at least the second portions to define adjacent photoelectric cells with the second portions.

8. The photoelectric conversion module of claim 3, wherein each of the second portions includes a space for accommodating a connection member for connecting the neighboring photoelectric cells.

9. The photoelectric conversion module of claim 3, wherein the inlet sealer is formed of one of a resin and a glass frit.

10. A photoelectric conversion module, comprising:
  a pair of substrates facing each other, forming a space containing an electrolyte therein, and containing a plurality of photoelectric cells therebetween, each of the substrates comprising first and second long sides parallel to each other and first and second short sides parallel to each other and disposed between the first and second long sides;
  a seal placed along edges of the pair of substrates and sealing the electrolyte, said seal comprising a continuous first portion extending along the first short side of the substrates, and second portions extending from the first portion corresponding to the first short side along a direction of the first and second long sides to end points, each respective second portion and an adjacent second portion defining a respective one of the photoelectric cells, and end points of adjacent second portions being separated from each other to form open portions comprising electrolyte inlets of each said respective one of the photoelectric cells; and
  an inlet sealer formed along the electrolyte inlet of each one of the photoelectric cells for sealing the electrolyte inlet of said each one of the photoelectric cells;
  each of the plurality of photoelectric cells comprising:
    first and second electrodes respectively formed on the pair of substrates;
    a semiconductor layer formed on the first electrode;
    a catalyst layer formed on the second electrode; and
    the electrolyte being disposed between the semiconductor layer and the second electrode, and between the catalyst layer and the first electrode.

11. The photoelectric conversion module of claim 10, wherein each of the pair of substrates has a rectangular shape.

12. The photoelectric conversion module of claim 10, wherein the sealing member has the open portion along the second short side of the pair of substrates.

13. The photoelectric conversion module of claim 10, wherein the:
  second portions separate adjacent photoelectric cells from each other.

14. The photoelectric conversion module of claim 10, wherein the inlet sealer is formed along the second short side of the pair of substrates, has a wide width along the direction of the first and second long sides of the pair of substrates, and contacts at least the second portions to define adjacent (photoelectric cells with the second portions.

15. The photoelectric conversion module of claim 10, wherein each of the second portions includes a space for accommodating a connection member for connecting adjacent photoelectric cells.

* * * * *